United States Patent
Segawa et al.

(10) Patent No.: US 6,941,055 B2
(45) Date of Patent: Sep. 6, 2005

(54) PHOTONIC CRYSTAL AND OPTICAL WAVEGUIDE ELEMENTS

(75) Inventors: Yuzaburo Segawa, Sendai (JP); Hiroshi Miyazaki, Sendai (JP); Noriaki Horiuchi, Sendai (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/998,899

(22) Filed: Nov. 30, 2004

(65) Prior Publication Data

US 2005/0100299 A1 May 12, 2005

Related U.S. Application Data

(62) Division of application No. 10/225,156, filed on Aug. 22, 2002.

(30) Foreign Application Priority Data

Aug. 23, 2001 (JP) .................................. 2001-252384
Aug. 15, 2002 (JP) .................................. 2002-237058

(51) Int. Cl.$^7$ .................................................. G02B 6/10
(52) U.S. Cl. ...................................... 385/129; 385/37
(58) Field of Search ........................... 385/16–18, 24, 385/37, 46, 47, 129, 122, 147

(56) References Cited

U.S. PATENT DOCUMENTS

| | | | |
|---|---|---|---|
| 5,526,449 A | 6/1996 | Meade et al. | 385/14 |
| 5,585,968 A | 12/1996 | Guhman et al. | 359/654 |
| 6,775,448 B2 * | 8/2004 | Zoorob | 385/122 |
| 2002/0041425 A1 | 4/2002 | Baba et al. | 359/322 |
| 2004/0012840 A1 | 1/2004 | Takiguchi et al. | 359/321 |
| 2004/0027646 A1 | 2/2004 | Miller et al. | 359/322 |

FOREIGN PATENT DOCUMENTS

| | | |
|---|---|---|
| JP | 2001-252384 | 9/2001 |
| WO | WO 00/49436 | 8/2000 |

OTHER PUBLICATIONS

C. Kittel: "Einführung in die Festkörperphysik" 1980, B Oldenbourg, München Wein; 1; p. 25, line 6,7 figure 10A.

Joannapoulos J. D.: The Almost–Magical World of Photonic Crystals; Brazilian Journal of Physics, Sociedade Brasileira De Fisica, Recife, Br, vol. 26, No. 1, Mar. 1, 1996, pp. 58–67.

Hu W et al; "Planar Optical Lattice of T102 Particles" Optics Letters, Optical Society of America, Washington, US, vol. 20, No. 9, May 1, 1995, pp. 964–966.

Golosovsky M et al.: "Self–Assembly of Floating Magnet Particles into Ordered Structures: A Promising Route for the Fabrication of Tunable Photonic Band Gap Materials"; Aplied Physics Letters, American Institute of Physics, New York, US, vol. 75, No. 26, Dec. 27, 1999, pp. 4168–4170.

Mekis A et al: "High Transmission Through Sharp Bends in Photonic Crystal Waveguides" Physical Review Letters, New York, NY, US, vol. 77, No. 18, Oct. 28, 1996, pp. 3787–3 2790.

(Continued)

*Primary Examiner*—Georgia Epps
*Assistant Examiner*—M. Hasan
(74) *Attorney, Agent, or Firm*—Sughrue Mion, PLLC

(57) ABSTRACT

A photonic crystal having a structure of which the refractive index changes with a periodicity defined in a polar coordinate system is disclosed. And an optical waveguide element comprising said photonic crystal, optical inlet and outlet regions on the surface of said photonic crystal, and a defect region of incomplete photonic crystal periodicity formed within said photonic crystal is disclosed. The defect region functions as an optical waveguide path by guiding from the inlet region to the outlet region an optical signal incapable of propagating through the photonic band gap of the photonic crystal.

12 Claims, 21 Drawing Sheets

OTHER PUBLICATIONS

Jianqiu Xu, et al. "Cylindrically symmetrical hollow fiber" Institute for Laser Science, University of Electro–Communications; Optics Communications 182(2000)343–348, Aug. 15, 2000.

Ozbay, et al., "Miromachined Millimeter–Wave Photonic Band–Gap Crystals", Applied Physical Letters, vol. 64(16), pp. 2059–2061, Apr. 18, 1994.

Yablonovitch, et al., "Photonic Band Structure: The Face Centered–Cubic Case Employing Nonspherical Atoms", Physical Review Letters, vol. 67, No. 17, Oct. 21, 1991, pp. 2295–2298.

Sugimoto, et al., "Fabrication and Characterization of Different Types of Two–Dimensional AIGaAs Photonic Crystal Slabs", Journal of Applied Physics, vol. 91, No. 3, Feb. 1, 2002, pp. 922–929.

Zoo Rob, et al., "Complete Photonic Bandgaps in 12–Fold Symmetric Quasicrystals", Nature, vol. 404, Apr. 13, 2000, pp. 740–743.

Bensity H. et al; "Optical and Confinement 1–10 Properties of Two–Dimensional Photonic Crystals" Journal of Lightwave Technology, IEEE. New York, US vol. 17, No. 11, Nov. 1999, pp. 2063–2077.

M. Loncar et al.; Journal of Lightwave Technology, Oct. 2000, vol. 18, No. 10, p. 1402–1411.

Toshihiko Baba, et al.; Technical Report Order Information of the Institute of Electronics, Information and Communication Engineers, May 13, 1999, vol. 99, No. 39 (OPE99–1), p. 1–6.

Chongjun Jin, et al; Two–dimensional dodecagonal and decagonal quasiperiodic photonic crystals in the microwave region; Physical Review B; vol. 61, No. 16, pges 10762–10767.

Mehmet Bayindir, et al.; Photonic band–gap effect, localization, and waveguiding in the two–dimensional Penrose lattice; Physical Review B. vol. 63, 161104–1 to 161104–4.

* cited by examiner (a)

(b)

(c)

(d)

-0.0058138  0.0062453

PHOTONIC CRYSTAL AND OPTICAL WAVEGUIDE ELEMENTS

This is a divisional of application Ser. No. 10/225,156 filed Aug. 22, 2002.

TECHNICAL FIELD

The present invention relates to the technical areas of photonic crystals and optical waveguide elements employing the same, and more specifically, to the technical areas of photonic crystals capable of forming full photonic band gaps and optical waveguide elements employing the same.

RELATED ART

Conventionally, structures having changing periodic refractive indexes, in other words periodic dielectric structures, are known to block light of a specific wavelength based on their periodicity (for example, see *Applied Physical Letters*, Vol. 64 (16), pp. 2,059–2,062, and *Physical Review Letters*, Vol. 67 (17), pp. 2,295–2,298). This is a phenomenon based on the structure forming a photonic band gap similar to the way in which normal crystals form electron band gaps. Thus, the structure is referred to as a "photonic crystal." A variety of research has been actively pursued in recent years. Photonic crystals are normally produced by artificially imparting periodic change to the refractive index of a structure. For example, they can be produced by periodically arranging areas of differing refractive indexes into a structure comprised of materials having specific refractive indexes. Conventional photonic crystals, mimicking crystals present in the natural world, for example, exploit the periodicity based on translational symmetry that is observed in trigonal, tetragonal, and similar lattices.

When employing photonic crystals in various precision optical equipment and the like, the photonic crystals are required to completely block light of specific wavelengths. However, conventional photonic crystals having periodic structures of translational symmetry have problems in that they are dependent on the direction of propagation of light, and the wavelengths of the photonic band gaps formed vary (referred to below as "directional dependence on photonic band gap"). Thus, in conventional photonic crystals, a broad range of photonic band gaps are formed to impart overlapping gaps and ensure blocking of light propagating in all directions. Imparting a broad range of photonic band gaps requires employing a structure of materials in which the photonic crystals have large differences in refractive index. In the natural world, air has the lowest refractive index. However, forming regions of air (holes and the like) in a structure compromises the strength of the structure, limiting its applications and possibly creating design problems in application to precision optical equipment. Further, a narrow range of materials from which to make selections, limited manufacturing methods, and the like are undesirable in practical terms. When it is possible to artificially impart changes in refractive index capable of forming a full photonic band gap in a photonic crystal, a photonic crystal capable of blocking electromagnetic radiation propagating in all directions is obtained. Such a photonic crystal affords the advantages of markedly improved performance in optical devices employing the crystal, production advantages, and a broader range of possible applications.

In recent years, optical waveguide elements employing photonic crystals have been the focus of great attention. These are devices in which linear defects of noncrystalline structure are formed in photonic crystals, light is confined to the defects, and the light propagates along the defects. Since the optical waveguide paths of photonic crystals have the property of strongly confining light by means of the existence of photonic band gaps, they afford the advantage of less light loss than conventional optical waveguide paths. Their application to various optical circuits is anticipated. However, two-dimensional photonic crystals having conventional trigonal and tetragonal lattices are problematic in that the introduction of defects is limited. For example, when forming optical waveguide paths with trigonal lattice crystals, linear defects can only be made to intersect at 60 and 120 degrees, and when employing tetragonal lattice crystals, linear defects can only be made to intersect at 90 degrees. Thus, in conventional photonic crystal optical waveguide paths, the angle of curvature in the direction of light propagation ends up being limited. Were it possible to freely bend the path of light being guided by a photonic crystal optical waveguide, it would be possible to broaden the degree of freedom of design in optical circuit applications, facilitating design.

SUMMARY OF THE INVENTION

The present invention, devised in light of the various above-described problems, has for its object to provide a novel photonic crystal capable of blocking light in all propagation directions and permitting the formation of a full photonic band gap. The present invention also has the object of providing a novel photonic crystal without directional dependence of the photonic band gap. The present invention has the still further object of providing a novel photonic crystal reducing restrictions on the selection of constituent materials and on manufacturing. The present invention has the additional object of providing optical waveguide elements affording low optical loss and a reduction in the restrictions on shape in the formation of optical waveguides. And the present invention has the still further object of providing an optical waveguide capable of reducing restrictions on the design of optical circuits when applied to optical circuits.

According to the present invention there is disclosed a photonic crystal having a structure of which the refractive index changes with a periodicity defined in a polar coordinate system.

There are also disclosed the photonic crystal in which refractive index changes between two values of $n_1$ and $n_2$ (where $n_1$ is not equal to $n_2$) based on a periodicity defined in a polar coordinate system; the photonic crystal wherein said periodicity is of a non-translational symmetry; the photonic crystal wherein said periodicity has a rotational symmetry; the photonic crystal wherein the refractive index changes based on a periodicity that is two-dimensionally defined in a polar coordinate system; and the photonic crystal in which a structural unit comprising a first material having a refractive index of $n_1$ and a second material having a refractive index of $n_2$ (where $n_1$ is not equal to $n_2$) repeatedly occurs at positions rotated by a θ degree ($0<\theta<<360$) about a point serving as the center of a polar coordinate system; the photonic crystal in which a region having a refractive index differing from air in space is arranged with a periodicity defined by a polar coordinate system.

According to another aspect of the present invention there is disclosed a photonic crystal comprising plural elements with a refractive index $n_1$, arranged in a two-dimensional rotational symmetry lattice; and plural spaces with a refractive index $n_2$ (where $n_1$ is not equal to $n_2$) between adjacent said elements.

According to further aspect of the present invention there is disclosed an optical waveguide element comprising a photonic crystal having a structure of which the refractive index changes with a periodicity defined in a polar coordinate system, optical inlet and outlet regions on the surface of said photonic crystal, and a defect region of incomplete photonic crystal periodicity formed within said photonic crystal, wherein said defect region functions as an optical waveguide path by guiding from said inlet region to said outlet region an optical signal incapable of propagating through the photonic band gap of said photonic crystal.

There are also disclosed the optical waveguide element wherein said photonic crystal has the structure in which refractive index changes between two values of $n_1$ and $n_2$ (where $n_1$ is not equal to $n_2$) based on a periodicity defined in a polar coordinate system; the optical waveguide element wherein said photonic crystal periodicity is of a non-translational symmetry; the optical waveguide element wherein said photonic crystal periodicity has a rotational symmetry; the optical waveguide element wherein said photonic crystal periodicity is two-dimensionally defined in a polar coordinate system; the optical waveguide element wherein said photonic crystal is in which a structural unit comprising a first material with a refractive index of $n_1$ and a second material with a refractive index of $n_2$ (where $n_1$ is not equal to $n_2$) repeatedly occurs at positions rotated by a $\theta$ degree ($0 < \theta << 360$) about a point serving as the center of a polar coordinate system; the optical waveguide element wherein said photonic crystal is in which a region having a refractive index differing from air in space is arranged with a periodicity defined by a polar coordinate system; the optical waveguide element wherein said defect region comprises at least one bend in the direction of light propagation; and the optical waveguide element wherein said defect region comprises at least one region lying in a circular arc in the direction of light propagation.

According to another aspect of the present invention there is disclosed an optical waveguide element comprising:

photonic crystal comprising plural elements with a refractive index $n_1$ arranged in a two-dimensional rotational symmetry lattice and plural spaces with a refractive index $n_2$ (where $n_1$ is not equal to $n_2$) between adjacent said elements;

optical inlet and outlet regions on the surface of said photonic crystal; and a defect region of incomplete said two-dimensional rotational symmetry lattice formed within said photonic crystal, wherein said defect region functions as an optical waveguide path by guiding from said inlet region to said outlet region an optical signal incapable of propagating through the photonic band gap of said photonic crystal.

DETAILED DESCRIPTION OF THE INVENTION

In contrast to conventional photonic crystals having periodicity defined in a rectangular coordinate system, that is, having changes in refractive index within the structure based on translational symmetry, the photonic crystal of the present invention is characterized by having changes in refractive index within the structure based on periodicity defined in a polar coordinate system. This periodicity defined in a polar coordinate system may be either two-dimensional or three-dimensional. In the present Specification, the term "photonic crystal" does not mean a conventional photonic crystal having within its structure a change in refractive index having translational symmetry, but rather is used in a manner including all structures having internal changes in refractive index capable of forming a photonic band gap. So long as the requirements of the present invention are satisfied, photonic crystals not included in the conventional definition of "photonic crystals" fall within the scope of the present invention.

Figure 1:
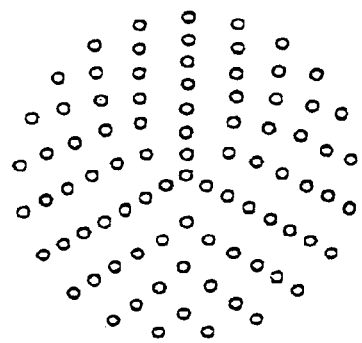
FIG. 1 shows examples of arrangements of the symmetries defined by a polar coordinate system permitting the application of the present invention.
Figure 1:
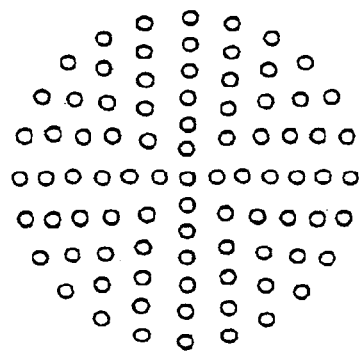
Figure 1:
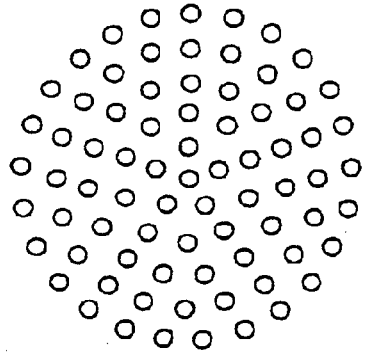
Figure 1:
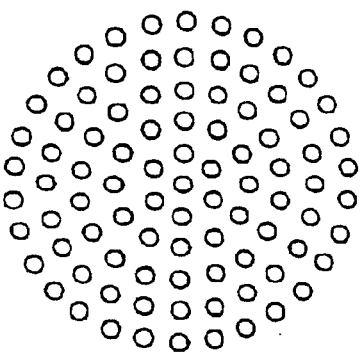
Figure 2:
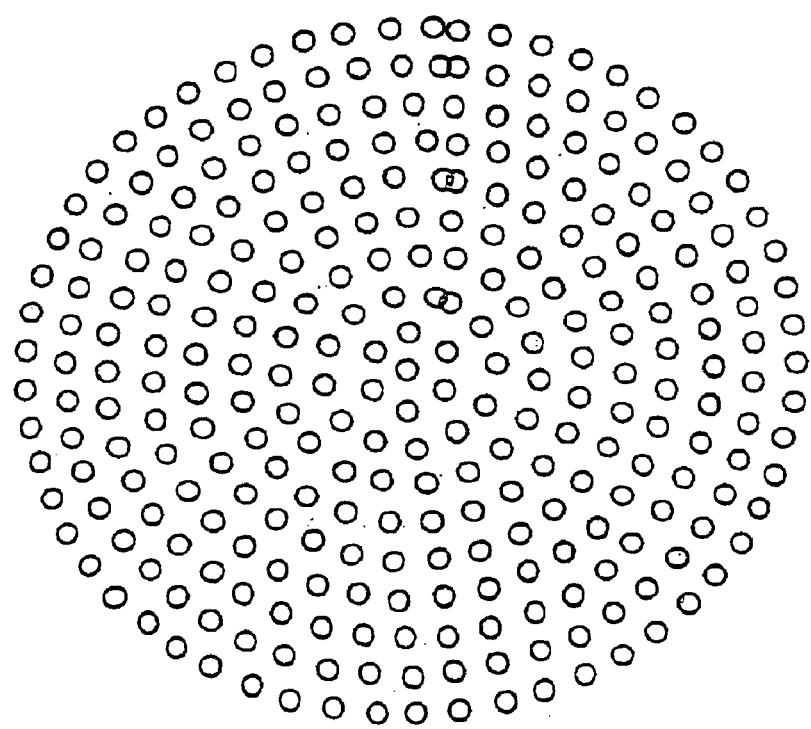
FIG. 2 shows an example of an arrangement of the symmetry defined by a polar coordinate system permitting the application of the present invention.

The phrase "periodicity defined in a polar coordinate system" means a state in which an identical base structure is arranged in repeating fashion in polar coordinate space. Taking the example of a two-dimensional polar coordinate system, this refers to a state having a structure repeatedly exhibiting the same arrangement at a position rotated by a certain angle about a center point. There are various periodicities; examples are a periodicity having a two-rotation symmetry in which the same structural unit repeatedly appears with each rotation of 180°; a periodicity having a three-rotation symmetry in which the same structural unit repeatedly appears with each rotation of 120°; and a periodicity having a four-rotation symmetry in which the same structural unit repeatedly appears with each rotation of 90°. Further, a periodicity having a single symmetry in which the same structural unit does not repeat unless rotated 360° is also included herein. FIGS. 1(a) through (d) show a three-rotation symmetry, four-rotation symmetry, five-rotation symmetry, and six-rotation symmetry, respectively. FIG. 2 shows a single-rotation symmetry arrangement. The present invention can be applied to all of these.

In a periodicity defined by a polar coordinate system, there are numerous rotational symmetries. A periodicity having rotational symmetry is desirably employed in the present invention. Although periodicities defined in polar coordinate systems may have arrangements that may be periodic in rectangular coordinate systems, that is, may have translational symmetry, so long as there is a structure the refractive index of which changes based on a periodicity defined in a polar coordinate system, irrespective of whether or not a translational symmetry exists, the structure is covered by the present invention. However, to reduce the directional dependency of the photonic band gap, a periodicity without translational symmetry is desirable.

The photonic crystal of the present invention is characterized by having a structure in which the refractive index changes based on a periodicity defined by a polar coordinate system. Normally, in a photonic crystal, there are two values defining the change in refractive index, and the greater the difference in the two values of refractive index, the greater the photonic band gap. The refractive index is specific to the material. Examples of materials having high refractive indexes of greater than or equal to 2 are: diamond (2.41), Si (about 3), $TiO_2$ (2.6), and $Ta_2O_5$ (2.3). Examples of materials having low refractive indexes are $SiO_2$ and optical glass. As set forth above, in conventional photonic crystals, to reduce the direction dependency of the photonic band gap, it is necessary to maintain an extremely large photonic band-gap width. Thus, many structures are configured of a region of lower refractive index in the form of air (for example, holes or voids), and a region comprised of a material of high refractive index. This results in drawbacks such as low strength and limited applications, as well as production drawbacks such as limits to the materials that can be employed. The photonic crystal of the present invention is configured of $Ta_2O_5$ or the like as a high refractive index range, and something other than air as the low refractive index range, such as a low refractive index material such as $SiO_2$, permitting the formation of a full photonic band gap. Nor does the photonic crystal of the present invention preclude the formation of air regions.

In the photonic crystal of the present invention, the period of the refractive index is not specifically limited, and may be determined based on the wavelength of the light that is to be blocked. For example, when the objective is to block visible light or near infrared radiation, it suffices to change the period of the refractive index by about the same amount as the wavelength of visible light or near infrared radiation.

In the photonic crystal of the present invention, it suffices to incorporate into some portion thereof a structure in which the refractive index changes based on a periodicity defined by polar coordinates. For example, photonic crystals configured by arranging structures in which the refractive index changes based on a periodicity defined by polar coordinates into a two-dimensional arrangement having translational symmetry are also covered by the photonic crystal of the present invention. As stated above, photonic crystals having a structure in which the refractive index changes based on a two-dimensional periodicity defined by polar coordinates are covered by the present invention; that is, photonic crystals having a structure having a refractive index that does not change based on a periodicity that is three-dimensionally defined by polar coordinates are also covered by the present invention.

Figure 3:
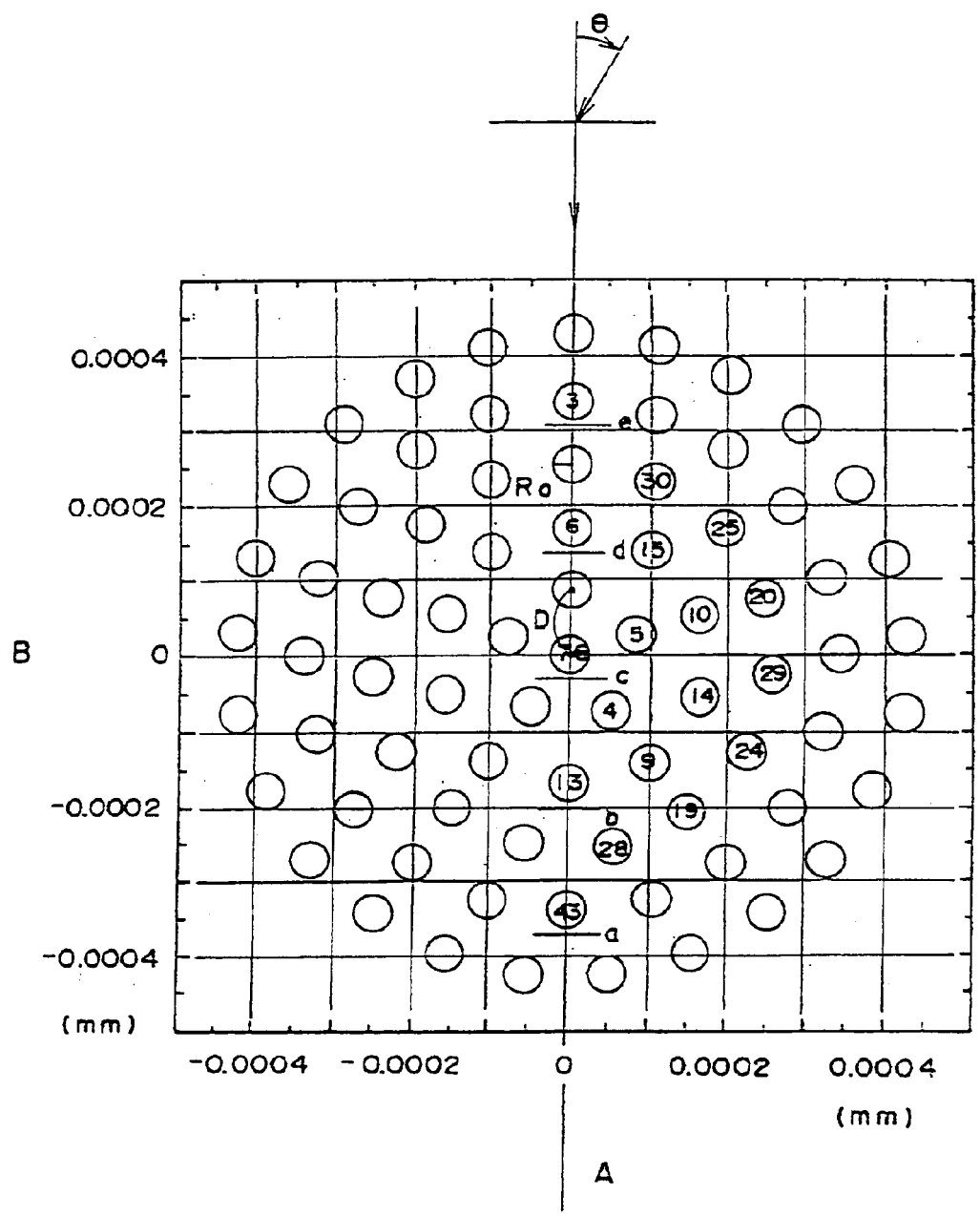
FIG. 3 is a schematic showing a model of a photonic crystal relating to the present invention.

One embodiment of the present invention is a photonic crystal arranged with a two-dimensional periodicity defined in a polar coordinate system by multiple rods comprised of a material having a refractive index $n_1$ ($n_1 > 1$, preferably $n_1 \geq 1.6$) in space (refractive index=1). The arrangement of two-dimensional periodicity can be accomplished, for example, as the arrangement of rotational symmetry shown in FIG. 3. In FIG. 3, an "O" denotes the position of a rod, and the number within the "O" is used to denote the position. In the arrangement shown in FIG. 3, the same array repeatedly appears at positions rotated by 72° about the center (position 76) of the polar coordinates, that is, is an arrangement having a five-rotation symmetry. It also has periodicity in a radial direction, and a periodicity in which concentric circles of rods arranged on the circumference of the circle repeat with a single period. As will be understood from FIG. 3, the rod arrangement does not have periodicity in rectangular coordinates; it is an arrangement without translational symmetry.

The following calculations were made for a photonic crystal having the structure with a refractive index changing based on the periodicity of FIG. 3 to confirm directional independence of the photonic band gap.

A structure obtained by arranging rods consisting of a material with a refractive index of 1.92 at the positions indicated by the 76 circles shown in FIG. 3 with each pair of rods having a center distance D (denoted by D in FIG. 3) between them of 85 micrometers was employed as the computational model. The diameter $R_0$ of the bottom surface of the rods (denoted by $R_0$ in FIG. 3) was made 22 micrometers, and the height of the rods was made infinitely large. The intensity of light reaching positions a-e in the model when light corresponding to millimeter-waves (frequencies of from 0 to 200 $cm^{-1}$) was radiated in the direction of the arrow (A=0) was calculated. Although the photonic band gap present can be demonstrated by irradiating light from within a photonic crystal and showing that light of specific wavelength does not leak to the outside, due to the properties of light, the same demonstration can be effected by reversing the arrival position and irradiation position of the light.

Figure 4:
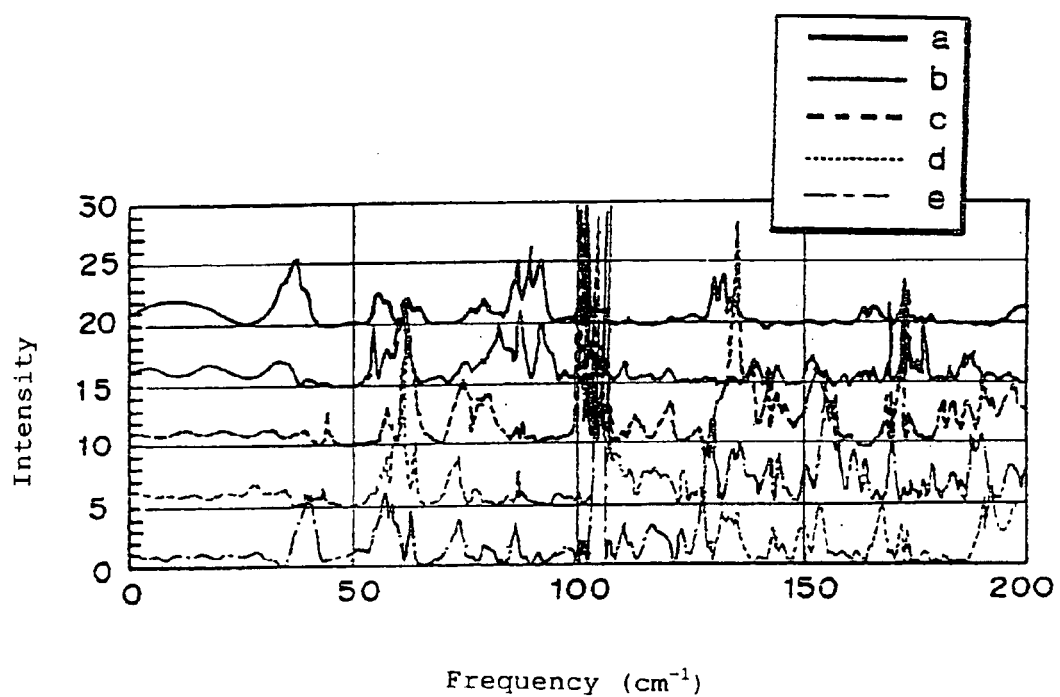
FIG. 4 is a graph showing the results of calculation of the intensity of incident light in a model of the photonic crystal of the present invention.

FIG. 4 gives the computation results. FIG. 4 shows graphs in which the frequency of light is plotted on the x-axis and the intensity of the light on the y-axis for light arriving at positions a–e. The computational results of FIG. 4 show that the light reaching any of the positions had an intensity at a frequency of about 50 cm$^{-1}$ that was extremely low. That is, in the model of the photonic crystal having a periodicity defined in the polar coordinate system shown in FIG. 3, the computations demonstrate that a photonic band gap was formed for light having a frequency of about 50 cm$^{-1}$. In these calculations, TM mode polarization was employed. However, such a photonic band gap can also be formed for TE mode polarization.

Figure 5:
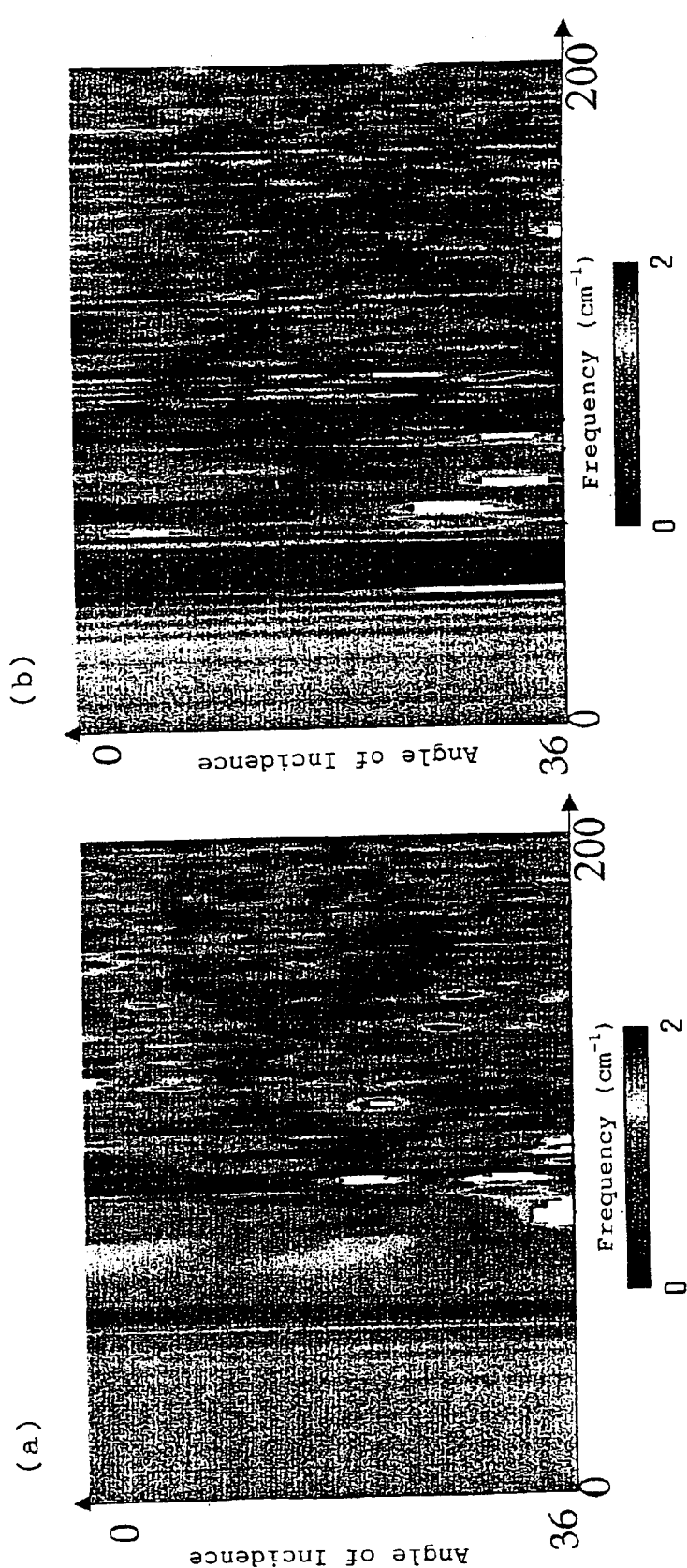
FIG. 5 consists of plots of contour lines showing the results of the calculation of the absolute values of the pointing vector at specific positions of incident light in a model of the photonic crystal of the present invention.

Next, to examine the directional dependence of the photonic band gap, as shown in FIG. 3, the direction of incidence of the light was displaced one degree at a time in direction θ (theta) over a total of 36 degrees (36 points), and when light entered at the various angles, the intensity of the light reaching point c was calculated. The computational results are given in FIGS. 5($a$) and ($b$), with the intensity of light being denoted as contour lines. FIG. 5($a$) shows the absolute value of the pointing vector of light reaching position c for TE mode polarization and FIG. 5($b$) shows the same for TM mode polarization. The x axis denotes the frequency cm$^{-1}$ (1 to 200, 400 points), and the y axis denotes the displacement (angle of incidence) in the direction of incidence of the light. The intensity of the absolute value of the pointing vector of the light is denoted by color darkness in the figures (by color in original figures). As will be understood from the scale recorded beneath the graphs, the pointing vector was most weak in the portions of dark color (dark blue in original figures). In both FIGS. 5($a$) and ($b$), there were regions of low pointing vectors near a frequency of 50 cm$^{-1}$ that are denoted as areas of dark color bands in the contour line drawings. These results indicate that in this photonic crystal model, the wavelength of the photonic band gap did not vary even when the direction of incident light was varied.

In the contour line drawings, analytic computations were made by the two-dimensional vector cylindrical-function expansion method. This was also the case in FIG. 6 below. Although the angle of incidence of the light was not rotated through 72 degrees (to the point of equivalence in a five-rotation symmetry), it may be presumed from the symmetry of the arrangement that similar computational results would be obtained in a 36-degree rotation.

Figure 6:
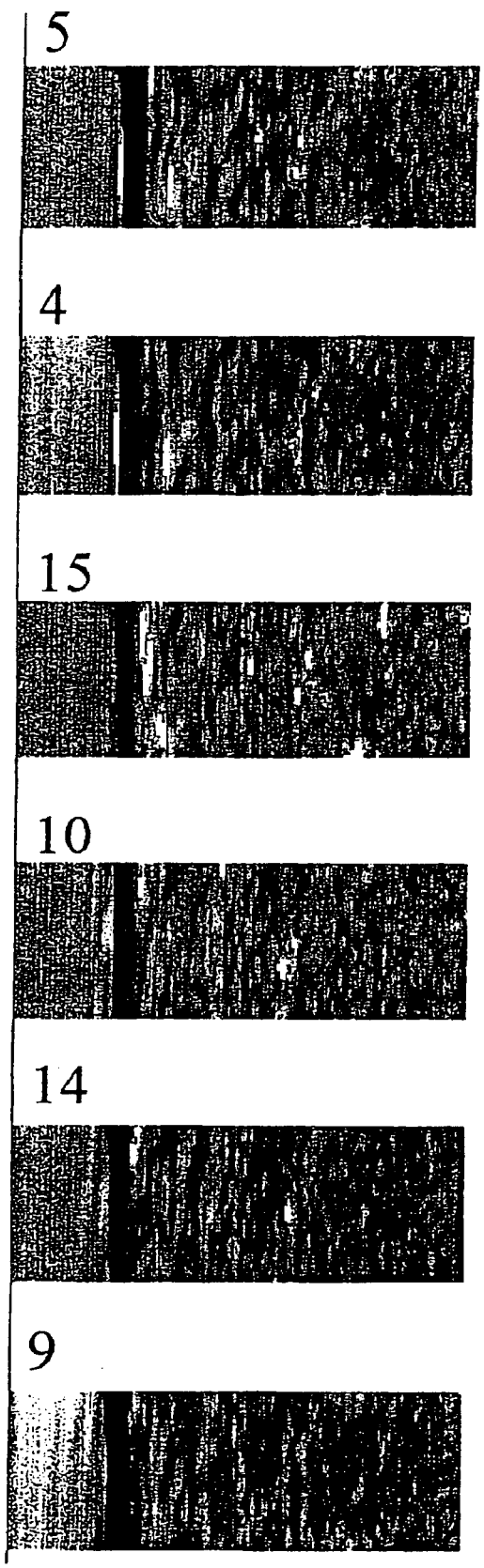
FIG. 6 consists of plots of contour lines showing the results of the calculation of the absolute values of the pointing vector at specific positions of incident light in a model of the photonic crystal of the present invention.

Similarly, the absolute values of the pointing vectors of the light reaching the various positions were calculated when the degree of incidence of the light was varied over a total of 36 degrees (36 points) for the positions of rods 4, 5, 9, 10, 14, and 16 in FIG. 3. The results are given in FIG. 6. FIG. 6 consists of contour graphs of the absolute values of the pointing vectors of light reaching the positions of rods 4, 5, 9, 10, 14, and 15 (calculated for TM mode polarization). The number recorded at the upper left of each of the contour line graphs indicates the position of the rod. In the contour line graphs of all of the positions of FIG. 6, there was no dependence on direction, there was a region where the pointing vector was low near a frequency of 50 cm$^{-1}$, and there was a band-shaped region of concentrated color (dark blue in original figures). These results indicate that even when the direction of entry of the light was varied in the model of this photonic crystal, there was almost no change in the wavelength of the photonic band gap not only at the center point (position 76), but also at positions to the outside. That is, this shows that there was no position and incident angle dependence of the photonic band gap.

It is assumed from the periodicity that calculations of pointing vectors for positions equivalent to positions 4, 5, 9, 10, 14, and 15 would yield similar results.

From these computational results it will be understood that when a material of relatively low refractive index (1.92) is employed, that is, when the difference in refractive index in the photonic crystal was low, even in an embodiment where it is not possible to form a wide photonic band gap, the photonic crystal of the present invention was able to block the light in all directions of propagation by forming a full photonic band gap. As is apparent in the results, a model in which the rods were comprised of a material with a comparatively low refractive index was employed in the above calculations. However, the same results would be achieved were the columns to be configured of a material of high refractive index. Further, in the above-described model, the computations were performed for electromagnetic waves on the order of millimeter-waves, but similar results would be obtained for computations on visible light to near infrared radiation. That is, with the photonic crystal of the embodiment, it is possible to form photonic crystals for visible light to near infrared radiation. In this embodiment, it suffices to position the rods to achieve a period with a wavelength of from visible light to near infrared.

In the above calculations, an arrangement with five-rotation symmetry was employed. However, it is possible to configure photonic crystals employing arrays having other than five-rotational symmetries. Further, in the above calculations, a photonic crystal having a structure in which rods having a round bottom surface were arranged. However, it is presumed that similar results would be achieved with photonic crystals in which polygonal rods having triangular, rectangular, and hexagonal bottom surfaces were arranged.

In the above-described embodiment, a photonic crystal having a configuration in which rods of a material other than air were arranged in air. However, it is also possible to manufacture the photonic crystal of the present invention by machining holes in a structure of relatively high refractive index other than air, and forming multiple rods of air or some other material (a material of relatively low refractive index, such as $SiO_2$) in the structure. Semiconductors such as Si and GaAs are materials of comparative high refractive index for which micromachining technology is highly developed. These materials are thus desirable for use as the above-mentioned structures. For example, Sugimoto, Y. et al., Journal of Applied Physics, Vol. 91, p. 922 (2002), FIGS. 4 and 5, disclose examples of the machining of trigonal lattice holes in semiconductors. The photonic crystal of the present invention can be fabricated by machining holes at the positions denoted by "O" in the figures based on the polar coordinates given in FIGS. 1 through 3 on the x-y plane of a structure comprised of a semiconductor using the techniques employed in the cited literature. The use of micromachining techniques permits the fabrication of photonic crystals in which a photonic gap band is present for light in the visible and infrared regions.

In a further embodiment of the present invention, a photonic crystal of a structure in which a structural unit comprised of a material (other than air) having a refractive index $n_1$ (other than air) and a material having a refractive index $n_2$ (where $n_1$ is not equal to $n_2$) is arranged with a periodicity defined by polar coordinates, specifically, in which the constitutional unit of the second material (other than air) has a structure repeating at a rotational position of precisely a certain angle about a center in the form of some point in the coordinate axis system. The present embodiment affords the advantage of high strength, since no space is formed in the structure. As is clear from the computational results set forth above, the incorporation of a structure having a refractive index changing with a periodicity defined by polar coordinates reduces the wavelength shift of the photonic band gap. Accordingly, due to the large difference in refractive index within the structure, there is no need to form voids, and, for example, even in a configuration comprising a combination of materials of comparatively low difference in refractive index, such as $SiO_2$ and $Ta_2O_5$, it is possible to block light in all directions of propagation.

The photonic crystal of the present implementation mode may be produced, for example, by a manufacturing method comprising a step of forming on a substrate surface irregularities arranged with a two-dimensional periodicity defined by a polar coordinate system, and a step of stacking a layer comprised of a material having a refractive index of $n_1$ and a layer having a refractive index of $n_2$ on the substrate surface having irregularities. When targeting a photonic crystal for visible to near infrared radiation, the irregularities formed on the substrate surface must be minute structures. In this case, it is desirable to form the irregularities by electron-beam lithography. An embodiment where the refractive index changes with three-dimensional periodicity, a structure in which the refractive index changes with three-dimensional periodicity can be manufactured by, for example, stacking multiple films (for example, films comprised of a material having a refractive index of $n_1$ and a refractive index of $n_2$) on a substrate having surface irregularities by bias sputtering or the like.

The photonic crystal of the present invention can be used to control electromagnetic waves, and is desirably employed as an optical waveguide element to control the direction of propagation of light. Further, an optical waveguide element employing the photonic crystal of the present invention can be employed in three-dimensional optical circuits, optical devices, and light-emitting devices. Since the photonic crystal of the present invention forms a full photonic band gap, when employed in light-emitting devices, for example, it can be expected to substantially improve light-emission efficiency.

An embodiment applying the photonic crystal of the present invention as a light waveguide element will be described next.

This embodiment of the present invention is an optical waveguide element comprised of the photonic crystal of the present invention, inlet and outlet regions formed in the surface of the photonic crystal, and a defect region formed in the photonic crystal and imparting incomplete periodicity to the photonic crystal. The defect region functions as an optical waveguide path guiding from the inlet region to the outlet region light that is incapable of propagating due to the photonic band gap of the photonic crystal.

In the optical waveguide element of the present invention, the presence of the photonic band gap of the photonic crystal confines entering light to the defect region formed in the photonic crystal and acts as an optical waveguide permitting the propagation of the confined light along the defect region.

In the optical waveguide element of the present invention, the use of the presence of the photonic band gap of the photonic crystal to confine light results in little loss of light by reflection or the like. Further, in the present invention, the use of a photonic crystal in which the index of refraction changes by having a periodicity defined by a polar coordinate system, the restrictions on the shape of the defect region that can be internally formed are reduced, and defect regions of various shapes can be formed. Accordingly, it is possible to readily form defect regions causing light to propagate in a desired direction, and when applied to optical circuits, permits a widening of the degree of freedom in the designing of optical circuits.

This embodiment of the optical waveguide element of the present invention is an optical waveguide element employing a photonic crystal having a two-dimensional periodicity of rotational symmetry in which a structural unit comprised of a first material of refractive index $n_1$ and a second material of refractive index $n_2$ (where $n_1$ does not equal $n_2$) occurs repeatedly at positions of prescribed rotation about some point as center of a polar coordinate system. An optical waveguide element employing a photonic crystal having a periodicity with rotational symmetry in the x-y plane (letting the z direction be infinitely large) shown in FIG. 7 will be described as an embodiment of the present invention. A photonic band gap based on a periodic structure of five-rotation symmetry is present in the x-y plane in a structure in which are arranged multiple rods (letting the z direction be infinitely large) comprised of a material with a refractive index of $n_2$ ($n_2$ being different from 1) at the positions denoted by "O" in FIG. 7 on the x-y plane (refractive index $n_1$=1) in (x, y, z) space.

Figure 7:
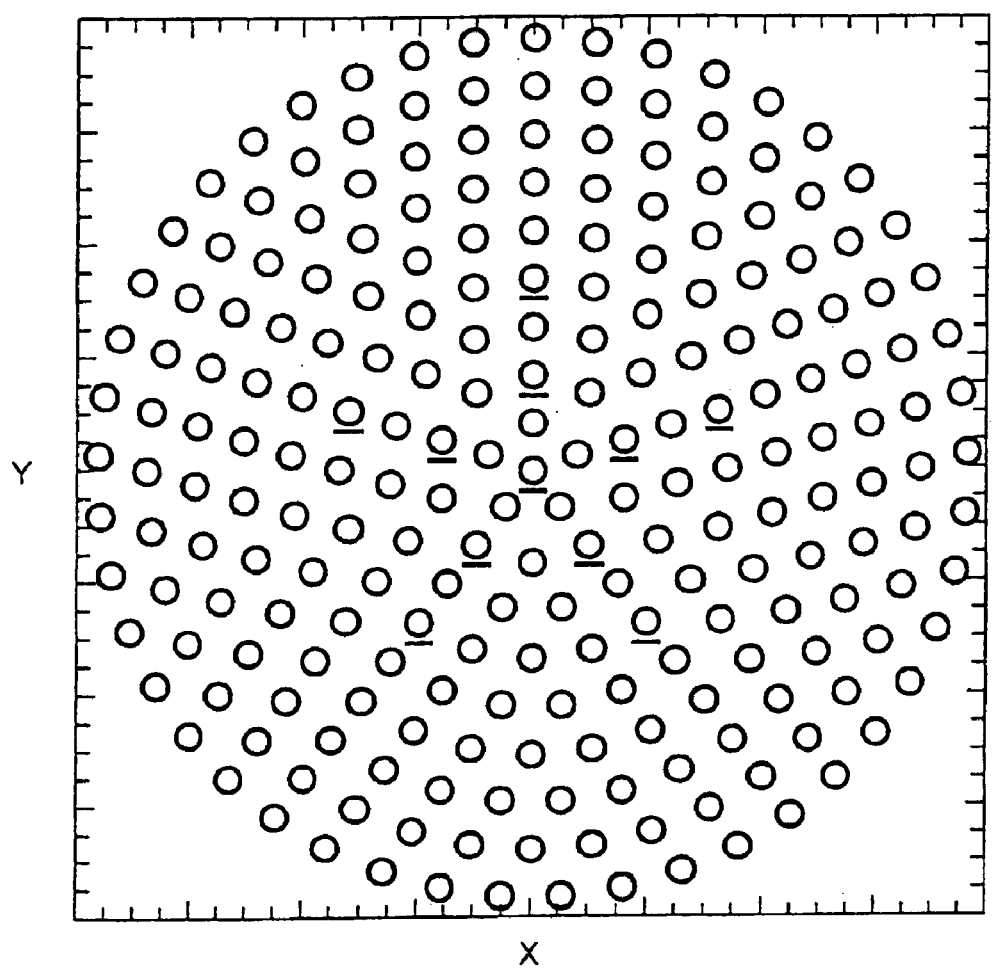
FIG. 7 is a schematic of the symmetry of an example of a photonic crystal relating to the present invention.

An optical waveguide element can be obtained by forming a defect region of incomplete periodicity in the photonic crystal exhibiting rotational symmetry shown in FIG. 7. One example of optical waveguide element of the present invention can be fabricated by taking two points on the circumference as the light inlet and outlet regions and removing the rods from a region connected through the center of the circle passing through these two points to form a defect region (for example, the space in which no "O"s are arranged in FIG. 8, with the z direction being infinite space), which functions as an optical waveguide path. Another example can be fabricated by taking two points on the circumference as the light inlet and outlet regions and removing the some rods from a region connected through the center of the circle passing through these two points to form a defect region (for example, the space in which no "O"s are arranged at interval of one "O" in FIG. 12, with the z direction being infinite space), which functions as an optical coupled cavity waveguide path. In a conventional optical waveguide element employing a photonic crystal having a trigonal or tetragonal lattice of two-dimensional periodicity, it is only possible to incorporate a linear defect intersecting at 60 degrees, 120 degrees, or 90 degrees due to the periodicity of the photonic crystal. However, in the optical waveguide element of the present invention, the range of selection of the angle of bend of the defect region is broadened. In photonic crystals exhibiting two-dimensional rotational symmetry, it is possible to take two points on the circumference as the optical inlet and outlet, form a defect region linking these two points through the center of the circle, and bend the direction of light propagation by any angle based on the number n of rotational symmetry.

Figure 8:
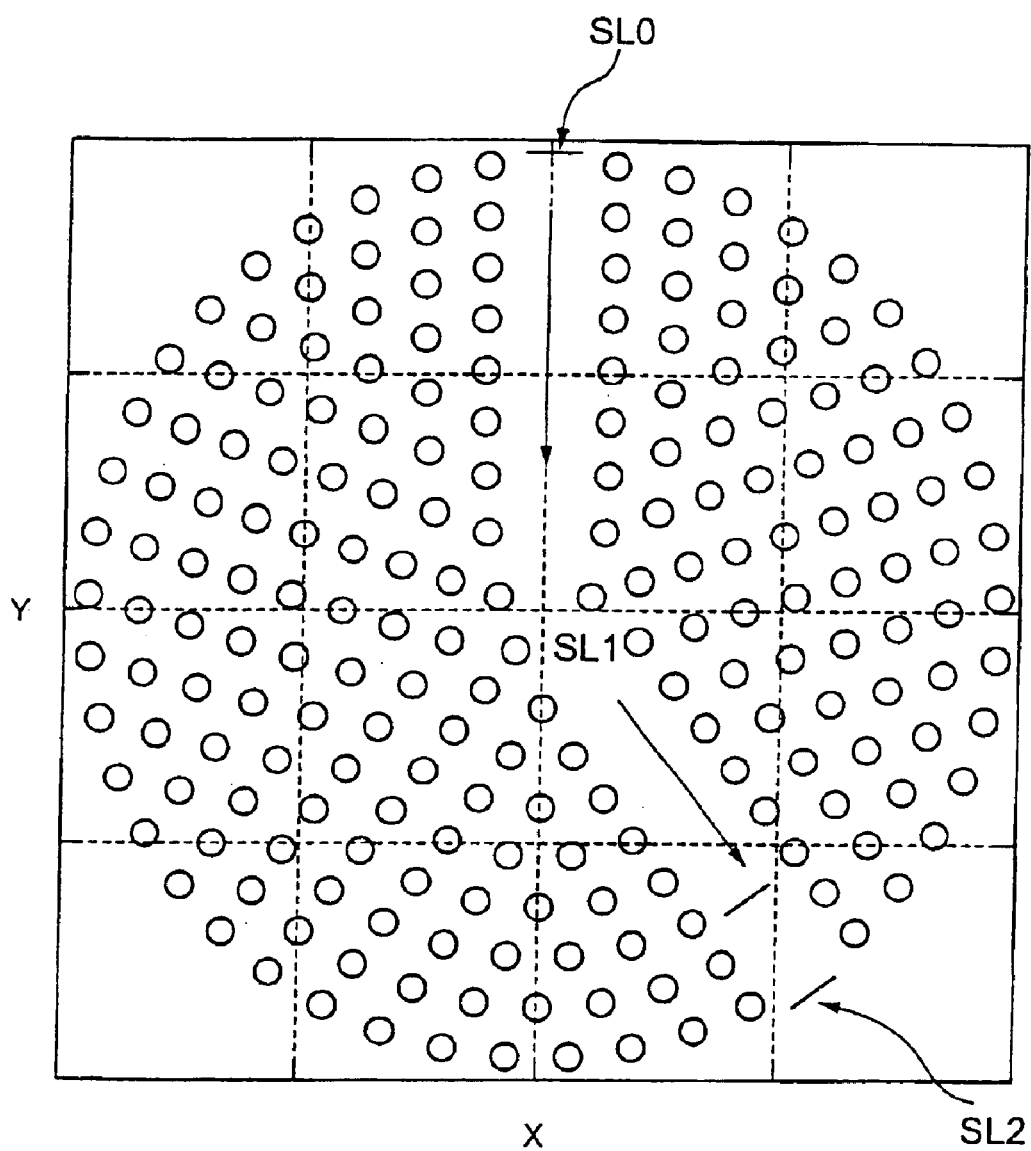
FIG. 8 is a schematic of examples of defect regions and symmetry in an optical waveguide element relating to the present invention.
Figure 9:
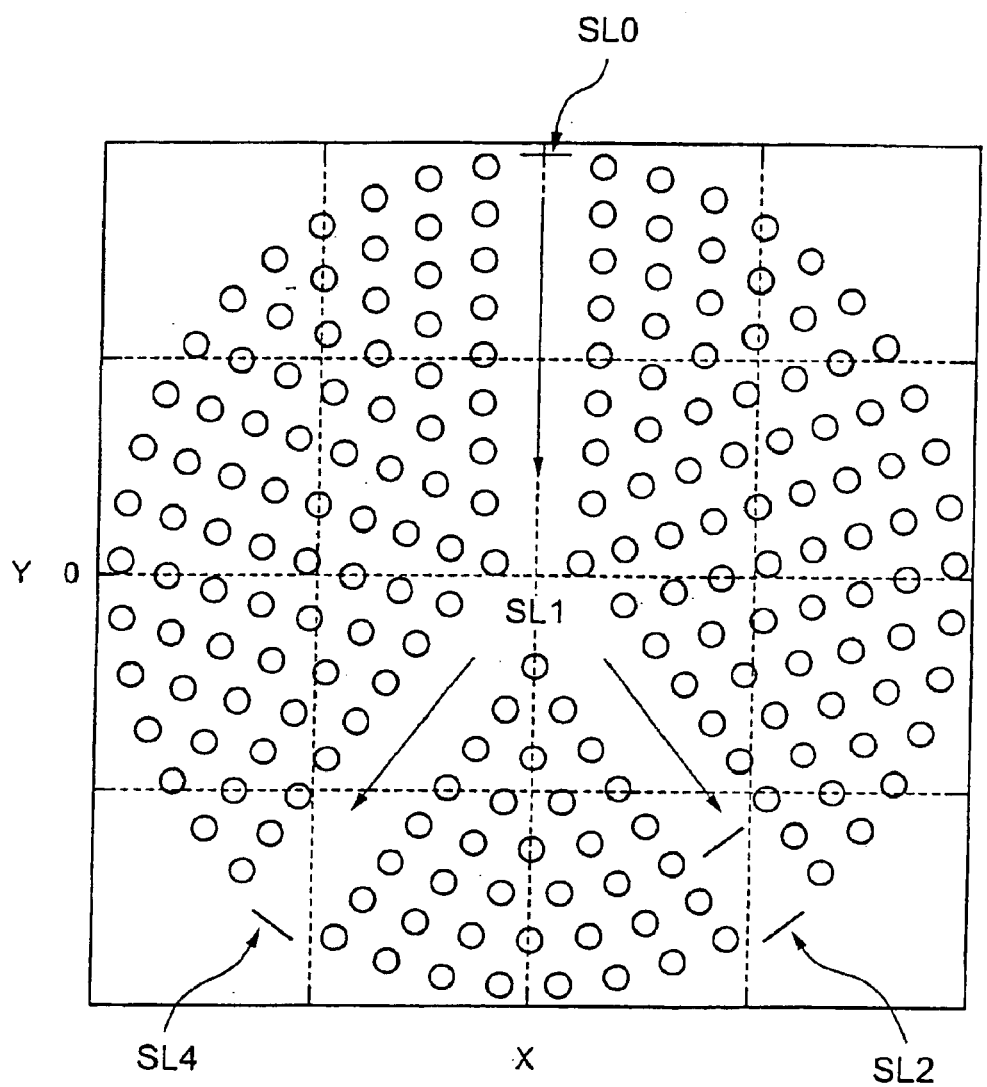
FIG. 9 is a schematic of further examples of defect regions and symmetry in an optical waveguide element relating to the present invention.
Figure 10:
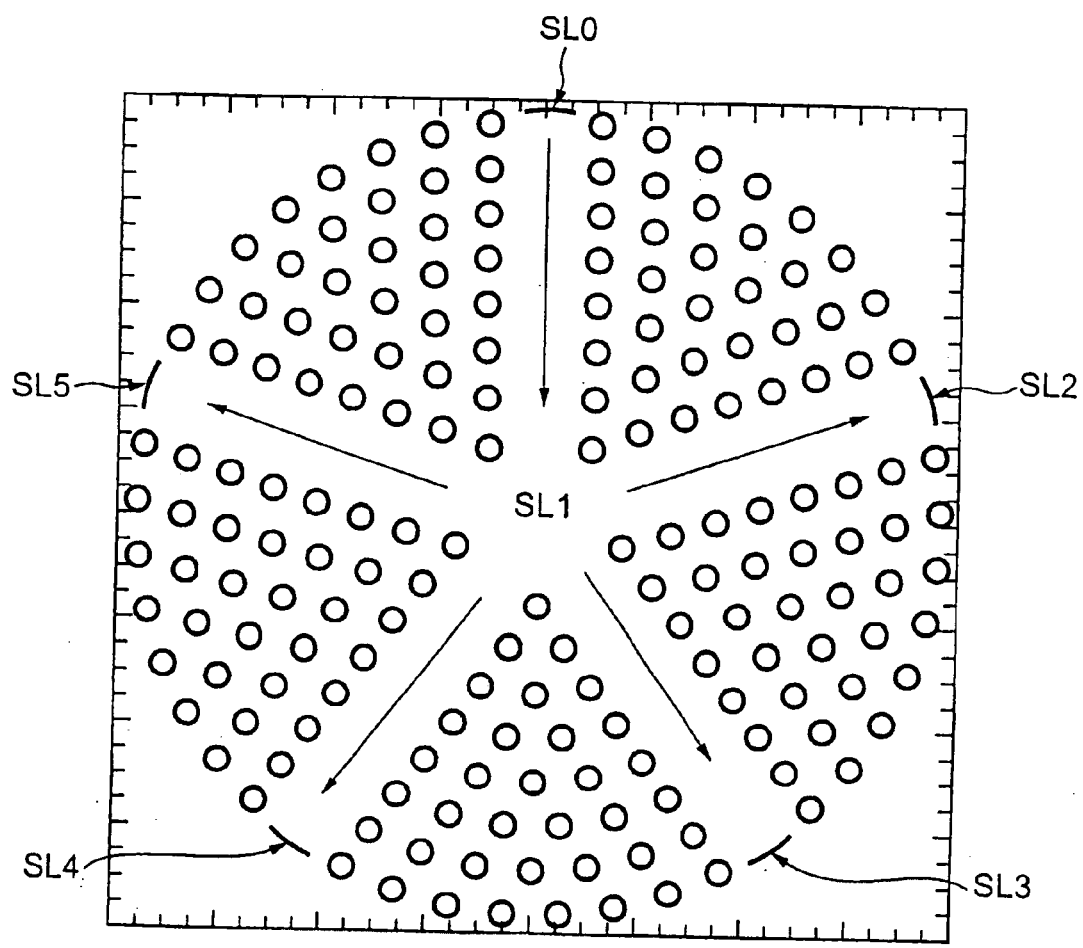
FIG. 10 is a schematic of further examples of defect regions and symmetry in an optical waveguide element relating to the present invention.

FIGS. 8 through 10 show embodiments in which points on the circumference of the photonic crystal shown in FIG. 7 are taken as the optical inlet and outlet and defect regions are formed along axes of rotational symmetry.

The optical waveguide element shown in FIG. 8 is an embodiment in which the points of intersection of two of the five-rotation symmetry axes with the circumference are taken as an optical inlet SL0 and outlet SL2, and a defect region is formed linking point SL0 and point SL2 through the center SL1 of the circle. Light enters through point SL0, is confined to the defect region, propagates along the defect region, and arrives at point SL2. The optical waveguide element of the periodic structure shown in FIG. 8 permits the bending of the direction of propagation by about 144 degrees while controlling the loss of light. Further, by varying the combination of the five-rotation symmetry axes forming the defect region, it is possible to configure an optical waveguide element bending by about 72 degrees in the direction of propagation of the light.

The optical waveguide element shown in FIG. 9 is an embodiment in which the two points SL2 and SL4 on the circumference are taken as outlets, point SL0 is taken as inlet, and a defect region is formed linking these points through the center SL1 of the circle. In this optical waveguide element, there is a fork in the direction of light propagation. In FIG. 9, when light entering through SL0 propagates along the defect region and reaches SL1, it branches about 36 degrees each both right and left, or a total of 72 degrees, reaching points SL2 and SL4. The optical waveguide element of FIG. 10 is an embodiment in which rods positioned along all five of the five-rotation axes are removed to form defect regions. In this optical waveguide element, when light entering at point SL0 propagates along the defect regions and reaches the center SL1 of the circle, it branches in four directions along the defect regions, reaching SL2 through SL5.

Figure 11:
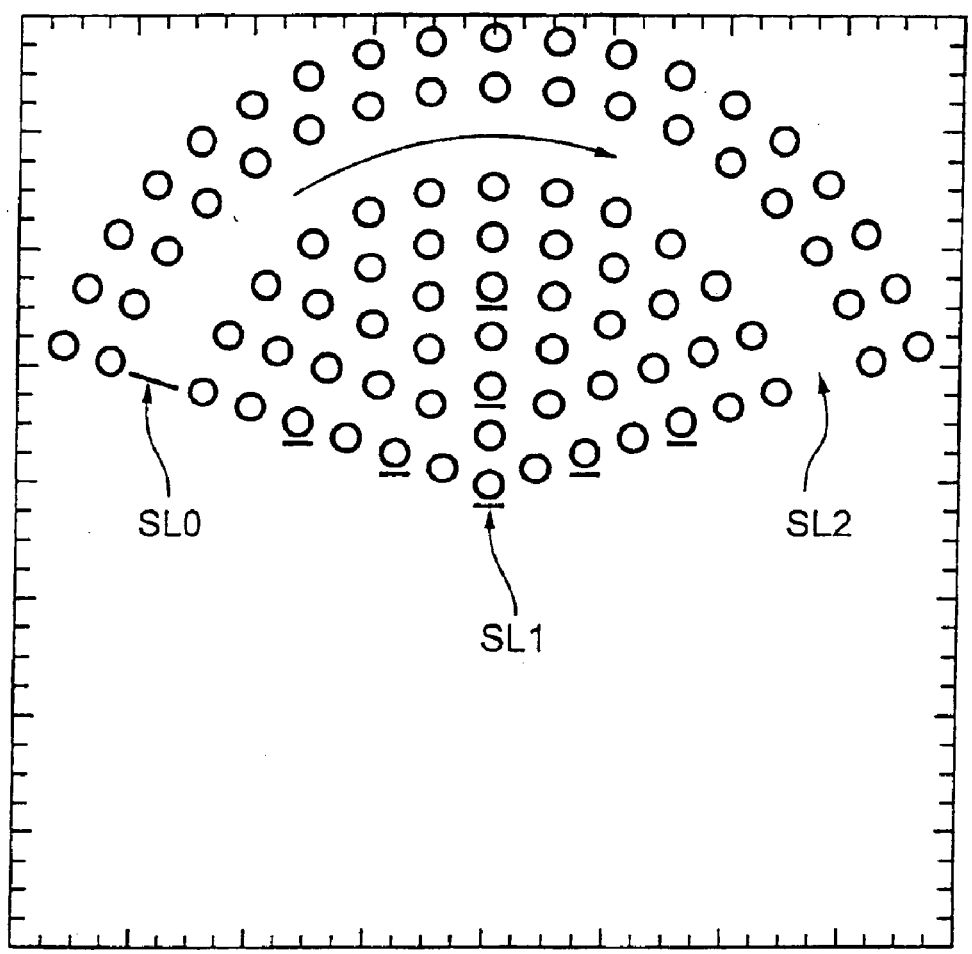
FIG. 11 is a schematic of further examples of defect regions and symmetry in an optical waveguide element relating to the present invention.

Further, in a photonic crystal exhibiting two-dimensional rotational symmetry as shown in FIG. 11, a photonic crystal in the shape of a fan defined by two radii comprised of straight lines and a segment of the circumference in the form of a curved line can be used to form an optical waveguide element. Not only can this photonic crystal be used as the above-described optical waveguide element having a bend and branching portions, it can also be used as an optical waveguide element in which the direction of advance of the light is an arc-shaped bend. For examples, as shown in FIG. 11, light inlet SL0 and outlet SL2 can be formed in radii and a defect connecting SL0 and SL2 in an arc can be formed to configure an optical waveguide element in which the direction of advancement of light is bent in an arc.

Figure 12:
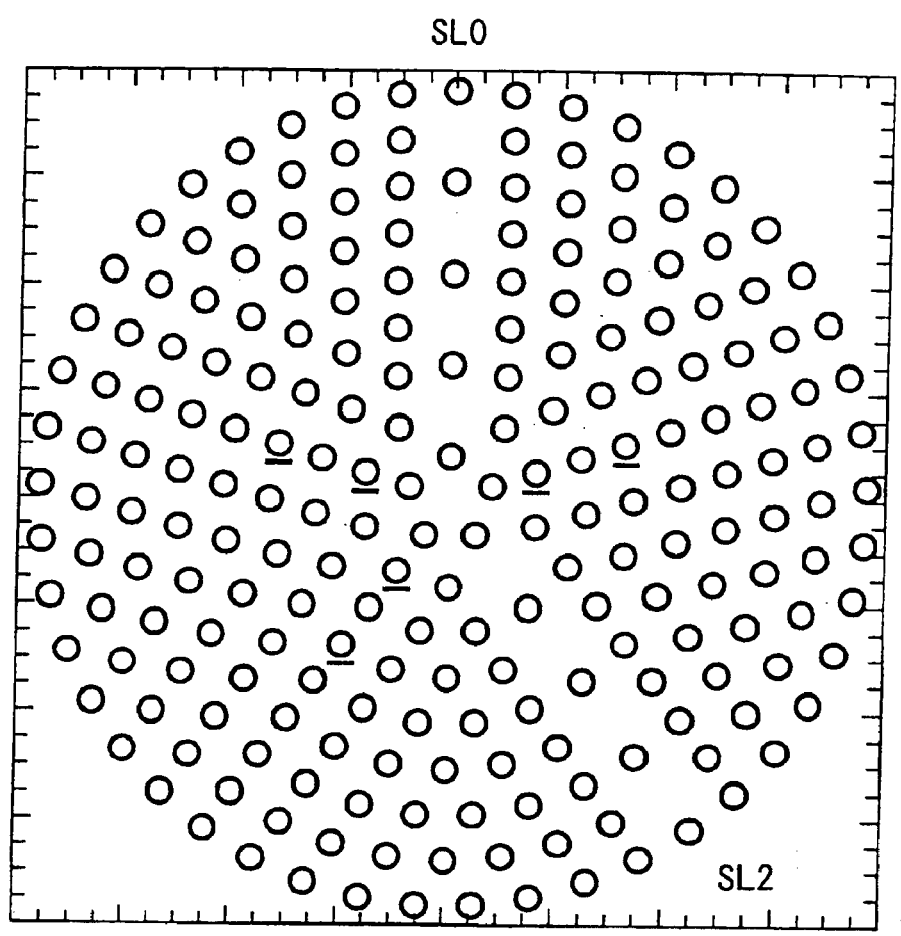
FIG. 12 is a schematic of further examples of defect regions and symmetry in an optical waveguide element relating to the present invention.

There are shown embodiments of optical defect waveguide elements in FIGS. 8 through 11, however, the photonic crystal of the present invention may also be employed coupled cavity waveguide. The optical waveguide element shown in FIG. 12 is a coupled cavity waveguide element which may be fabricated by removing rods at interval of a rod, not removing as all rods as FIG. 8, from a region connected through the center passing through SL0 to SL2 to form a defect region in the photonic crystal as shown in FIG. 7.

The defect region shown in FIG. 8 was formed in the photonic crystal shown in FIG. 7 and the following calculations were made of the transmitted spectrum at position SL2 in the figure to confirm operation as an optical waveguide element.

Figure 13:
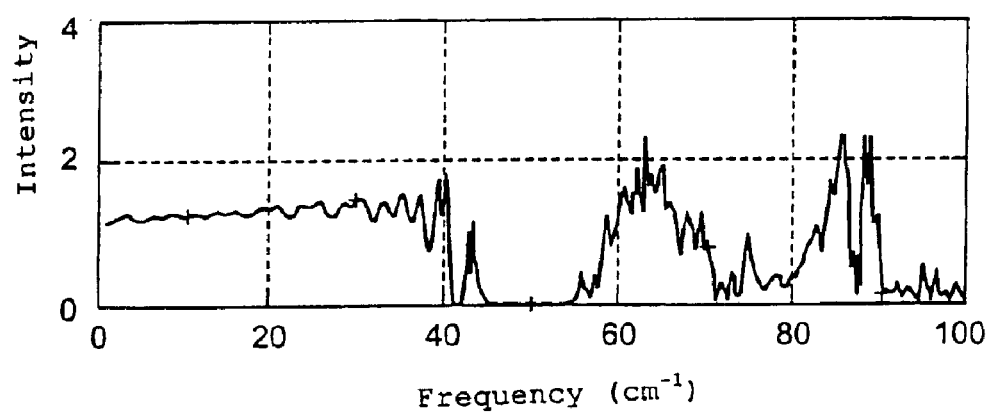
FIG. 13 consists of graphs showing the results of calculating the electric field intensities of models of photonic crystals relating to the present invention.

A structure in which the rods made of a material having a refractive index of 1.92 (dielectric constant of 3.7) were arranged at the positions denoted by circles "0" in FIG. 7, with a center distance of D=85 micrometers between pairs of rods on the five-rotational symmetry axes, was adopted as the computation model and the internal electric field intensities were calculated. The radius of the bottom surface of the rods was made 22 micrometers and the height of the rods was assumed to be infinite. The results are given in FIG. 13. FIG. 13 consists of graphs showing the results with light frequency plotted on the x-axis and light intensity on the y-axis. The computational results of FIG. 13 reveal that a photonic band gap was present in the structure of FIG. 7 with its center at 50 $cm^{-1}$.

Next, the transmitted spectrum at SL2 was computed from a computational model obtained by removing multiple rods from the structure shown in FIG. 7 to form an internal defect region and achieve the structure shown in FIG. 8. Specifically, the rods positioned on two of the five-rotation symmetry axes, or a total of 19 rods, were removed from positions of five-rotation symmetry in FIG. 7 to form defect regions. It was assumed that light corresponding to millimeter-waves (frequency of from 0 to 200 $cm^{-1}$) was irradiated at SL0, and the transmitted spectrum reaching position SL2 was computed.

Figure 14:
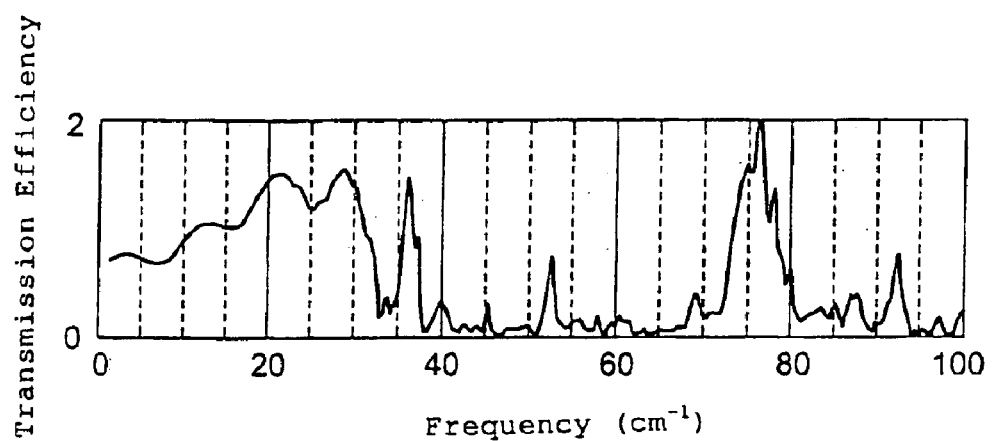
FIG. 14 consists of graphs showing the results of computing the electric field intensities of models of optical waveguide elements relating to the present invention.

FIG. 14 gives the computational results. FIG. 14 is a graph showing the computation results with light frequency plotted on the x-axis and transmission efficiency plotted on the y-axis. In FIG. 14, a transmission efficiency peak is present near 52 $cm^{-1}$, the point where the light intensity was 0 in FIG. 13. The results reveal that a transmission mode was present in the structure of FIG. 8. As shown in FIG. 13, a photonic band gap was present in the structure of FIG. 7, with 40 to 80 $cm^{-1}$ electromagnetic waves being unable to pass through the structure. However, in the model in which the defect region shown in FIG. 8 was formed, propagation of electromagnetic waves was possible in the defect range in the vicinity of 52 $cm^{-1}$. That is, the fact that the structure shown in FIG. 8 functioned as an optical waveguide element was proven by the computations.

Figure 15:
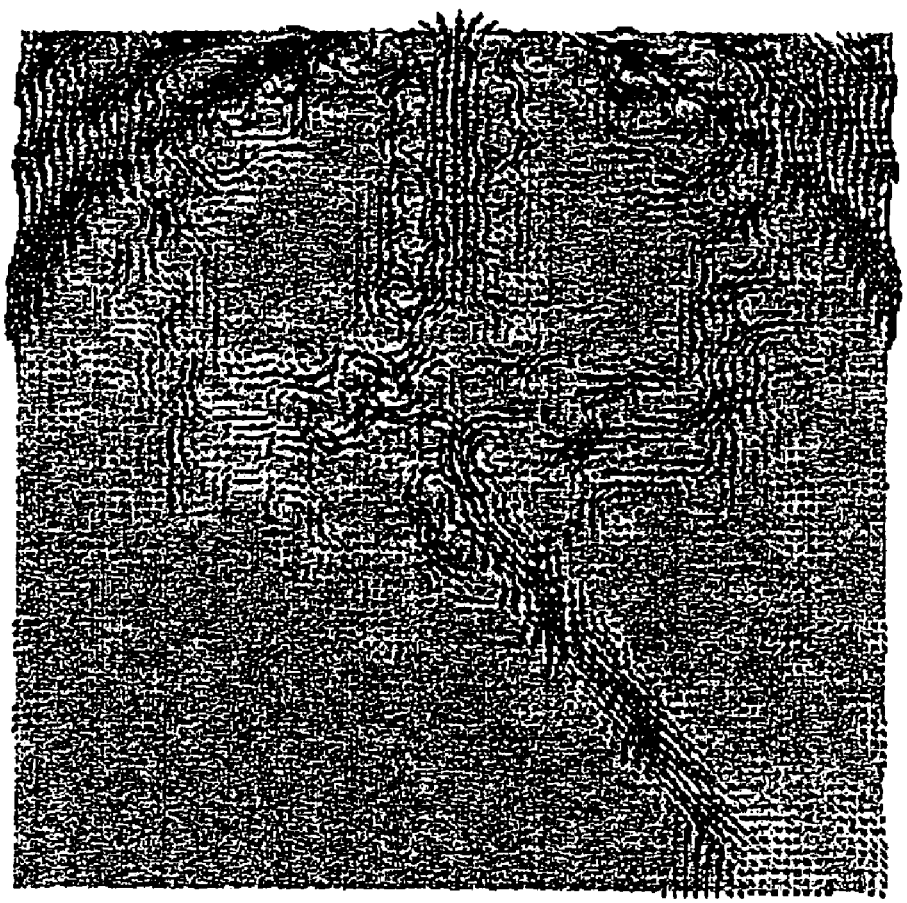
FIG. 15 consists of graphs showing the results of computing the distribution of intensities within the crystal in a model of an optical waveguide element relating to the present invention.
Figure 15:

FIG. 15 shows the results of computations of the intensity distribution within a crystal with a transmission mode of electromagnetic waves in the vicinity of 52 $cm^{-1}$. The intensity distribution is indicated by color density (actual color) in the figure, with dark colored portions (actual red) indicating the greatest intensity on the scale indicated beneath the graph. The computational results of the intensity distribution shown in FIG. 15 indicate that electromagnetic radiation near 52 $cm^{-1}$ propagated along the optical waveguide path in the form of the defect region.

Next the transmitted spectrum at SL2 was computed taking the structure shown in FIG. 9, in which multiple columns were removed from the structure shown in FIG. 7 to form a branching defect region, as the computational model. Specifically, a total of 28 rods were removed from positions on three of the five rotation symmetry axes in the five-rotation symmetry arrangement shown in FIG. 7 to form defect regions. It was assumed that SL0 was irradiated with light corresponding to millimeter-waves (frequencies of from 0 to 200 $cm^{-1}$), and spectrum of transmitted light reaching position SL2 was calculated. The results are given in FIG. 16. The results of the calculation of the intensity distribution within a crystal of that transmission mode are given in FIG. 17.

Figure 16:
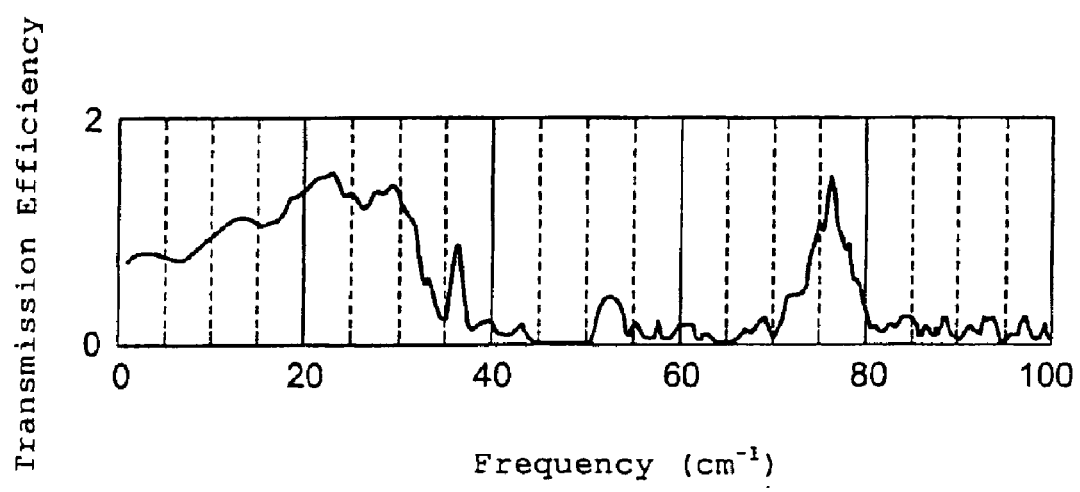
FIG. 16 consists of graphs showing the results of computing the electric field intensities in a further model of an optical waveguide element relating to the present invention.
Figure 17:
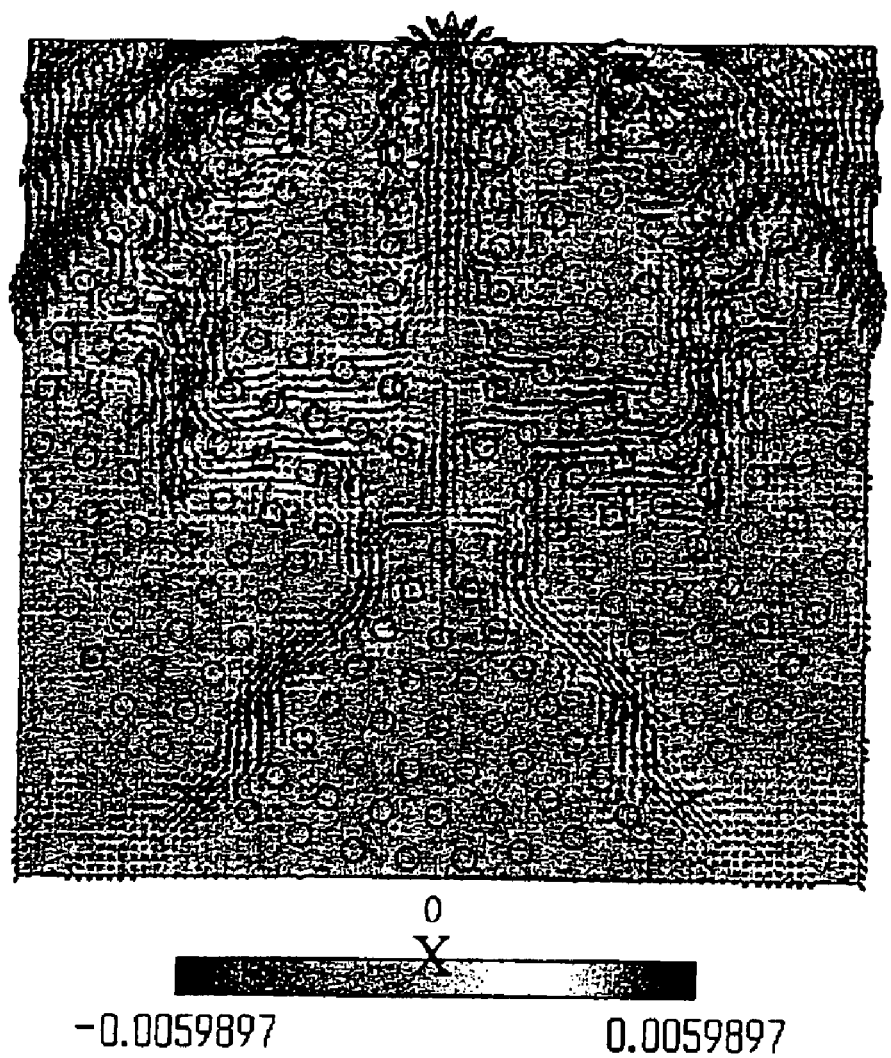
FIG. 17 consists of graphs showing the results of computing the distribution of intensities within the crystal of a further model of an optical waveguide element relating to the present invention.

As in the computation results shown in FIG. 14, a transmission mode was present in the vicinity of 52 $cm^{-1}$ in FIG. 16. FIG. 17, showing the intensity distribution within a crystal of that transmission mode, indicates that electromagnetic radiation entering at SL0 branched evenly, reaching SL2 and SL4.

For the sake of simplicity, the above-described embodiments have described the use of the photonic crystal of the present invention in defect waveguides. However, the photonic crystal of the present invention may also be employed in coupled cavity waveguides.

EXAMPLES

The present invention is described in detail below through embodiments. The materials, proportions, operations and the like given in the embodiments below may be suitably varied without departing from the spirit of the present invention. Accordingly, the scope of the present invention is not limited to the specific examples given below.

Figure 18:
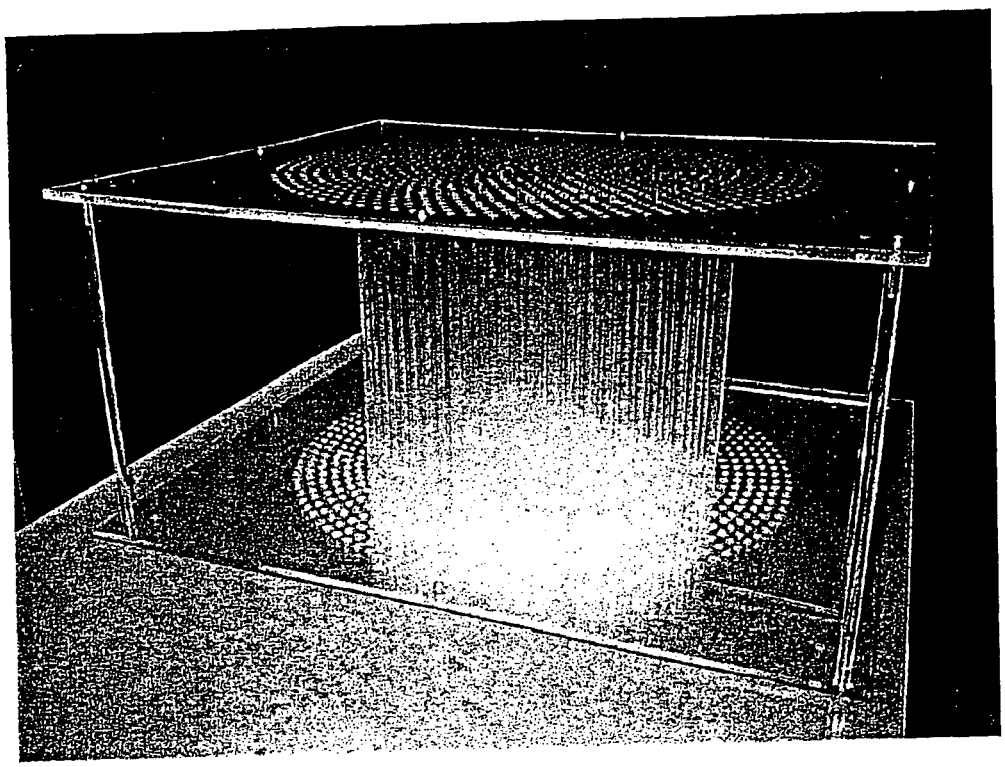
FIG. 18 is a photograph of a photonic crystal produced in an embodiment.

The structure shown in FIG. 18 was fabricated. The structure shown in FIG. 18 was comprised of air (refractive index 1.0) and multiple acrylic rods (refractive index 1.61) and had a two-dimensional periodicity with five-rotation symmetry in the x-y plane, and could be assumed to have a shape that was infinite in the z direction. Specifically, the structure was fabricated by arranging 700 acrylic rods 300 mm in length and 3 mm in radius at (x, y) coordinates satisfying the following equations:

$$x = R \times \sin\{(360 \times n)/5N\}$$

$$y = R \times \cos\{(360 \times n)/5N\}$$

In the equations, R denotes the radius, given by the spacing of the acrylic rods multiplied by N. The actual spacing of the acrylic rods was 12 mm. N corresponds to the number of concentric circles, and is an integer of from 0 to 20. n denotes the number of rods (from 1 to 5) on a single radius (R).

Figure 19:
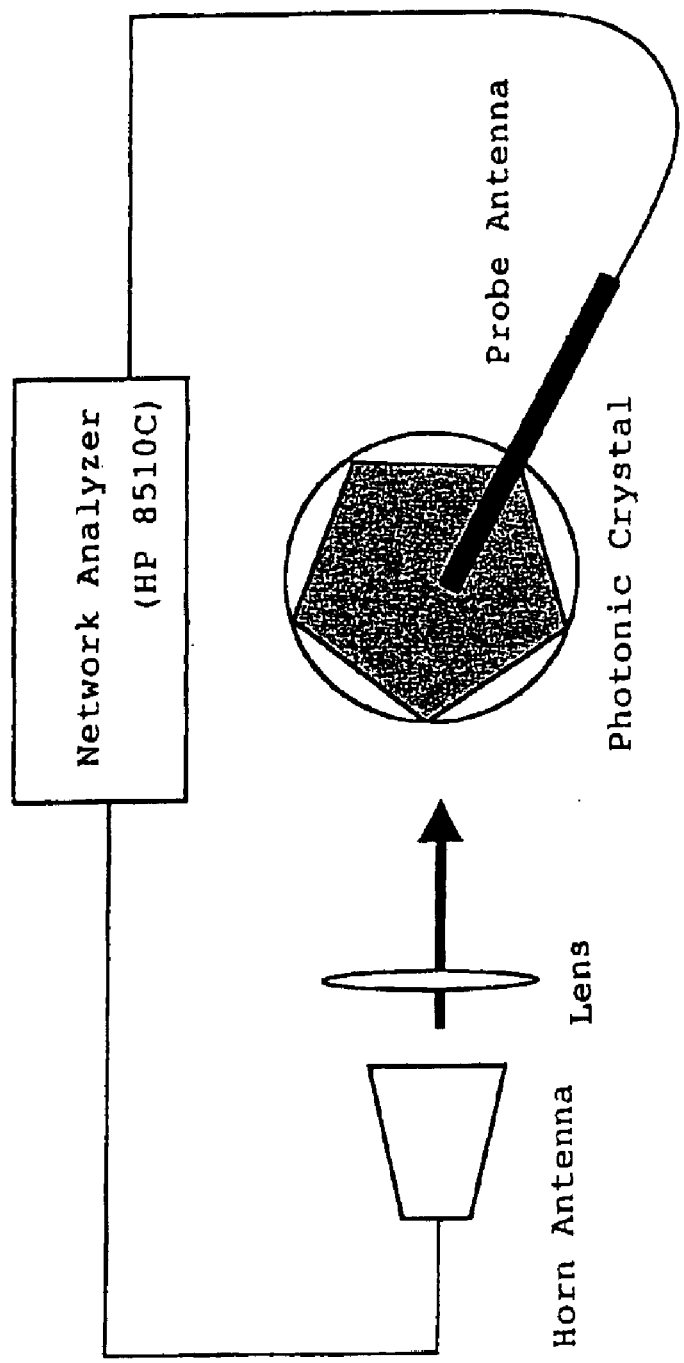
FIG. 19 is a schematic of the method of measuring the electric field intensity within the photonic crystal in the embodiment.
Figure 20:
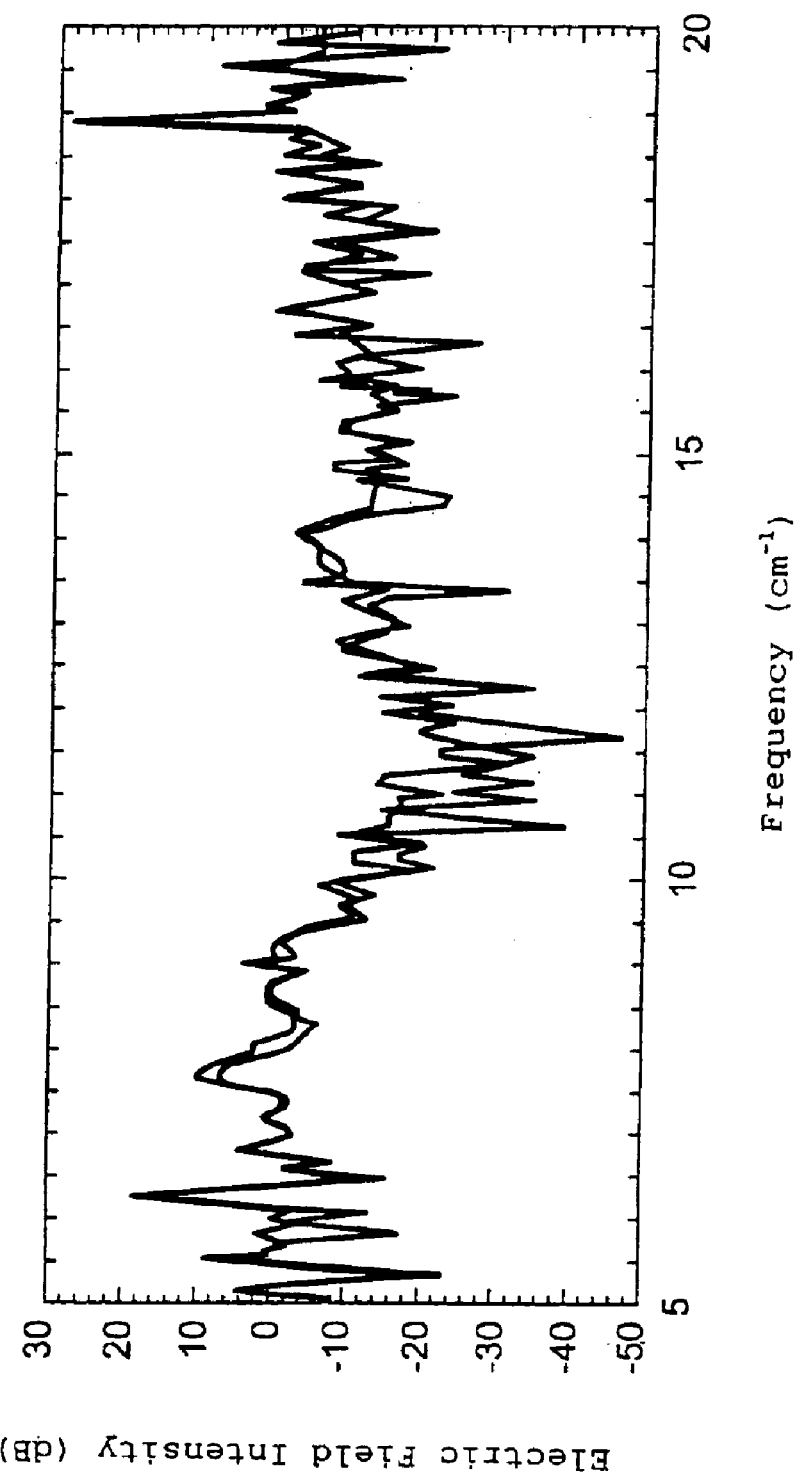
FIG. 20 shows the spectrum of electric field intensity actually measured for the photonic crystal produced in the embodiment.

In this structure, the internal electric field intensity was measured. A schematic of the method employed is given in FIG. 19. Electromagnetic radiation generated by a Network Analyzer (HP8510C) was emitted through a horn antenna and directed onto the structure through a lens. The electric field intensity within the structure was detected with a probe antenna. FIG. 20 gives the spectrum of the electric field intensity detected with this test system. FIG. 20 is a graph showing the measurement results in which the electric field intensity is plotted on the y-axis and the frequency is plotted on the x-axis. In the graph, two sets of measurement results are superimposed. FIG. 20 reveals that within this structure, the electric field intensity was reduced sharply in a zone centered on 12 GHz. That is, the structure of FIG. 18 was found to be a photonic crystal with a photonic band gap present.

Figure 21:
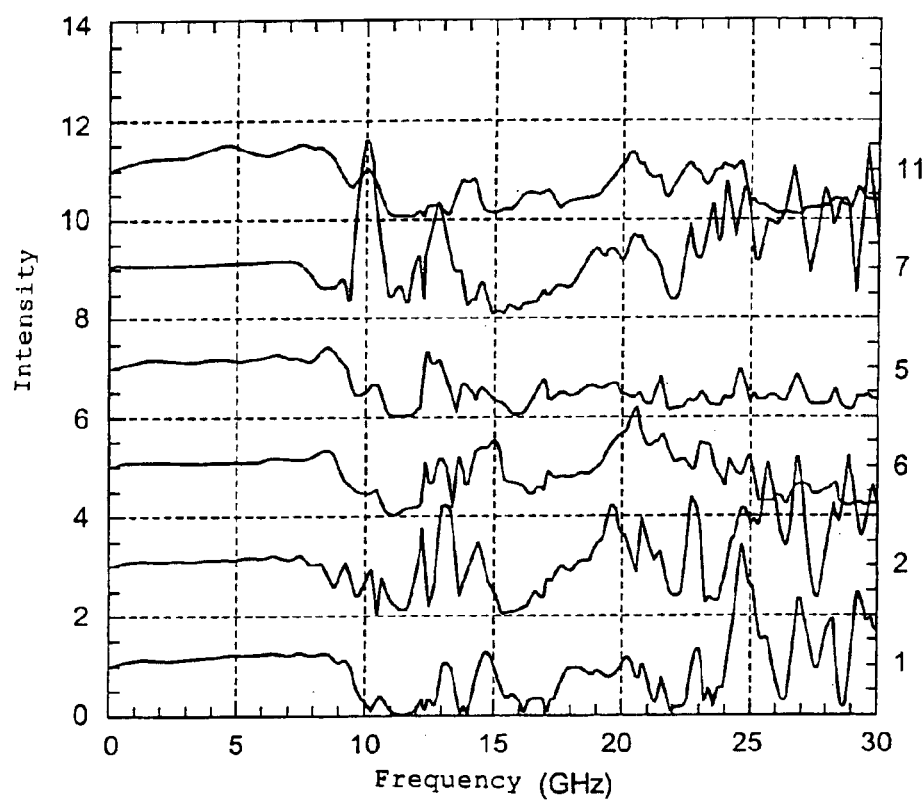
FIG. 21 consists of graphs showing the results of calculations of the electric field intensity of a computation model corresponding to the photonic crystal produced in the embodiment.
Figure 21:
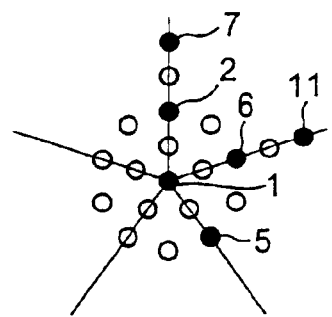

Since the results obtained by the above-described test system were found to match the calculated results, a computation model of the photonic crystal shown in FIG. 18 was employed to calculate the intensity of light entering at various positions in the photonic crystal by the same method used to derive the computation results given in FIG. 4. However, in the computation used to derive the results given in FIG. 4, the refractive index of the rods was 1.92, the radius of the rods was 11 micrometers, and the distance between rods was 85 micrometers. However, in the present computations, to achieve correspondence with the results obtained with the above-described test system, the refractive index of the rods was made 1.61, the radius of the rods was made 3 mm, and the distance between rods was made 12 mm. Further, in the model of FIG. 18, since the number of concentric circles in (x, y) coordinates was more than in the computational model of FIG. 3, the number of measurement positions was increased from 5 to 8. The results are given in FIG. 21. These computational results also exhibited a marked decrease in electric field intensity centered at about 12 GHz.

Figure 22:
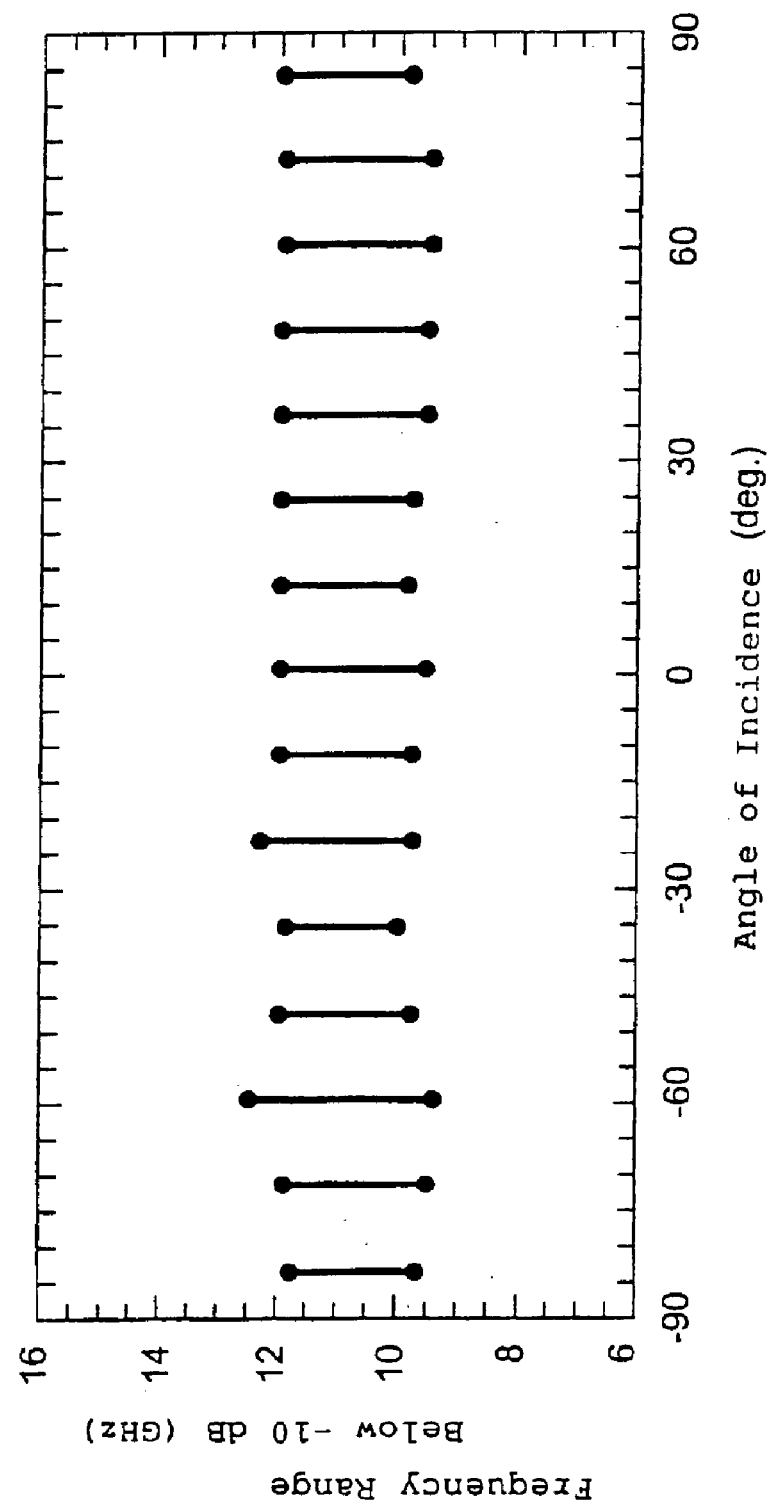
FIG. 22 is a graph showing the directional dependency of the nick bank gap actually measured for the photonic crystal produced in the embodiment.

The direction of incident light was varied and the dependence on direction of the photonic band gap was actually measured for the structure of FIG. 18. The results are given in FIG. 22. FIG. 22 is a graph showing that when the entry direction was changed from 0 to 90°, the intensity dropped to below −10 dB, that is, it is a graph showing the frequency range in which the photonic band gap was present. As will be clear from the test results of FIG. 22, the structure of FIG. 7 exhibited nearly identical photonic band gap frequencies even when the angle of light incidence was varied. These test results conform to the calculated results given in FIG. 5.

These test results reveal that a photonic band gap was present in the structure of FIG. 18 and that there was no directional dependence of the photonic band gap. Further, these test results match the calculated results, suggesting that if computation proves the presence of a photonic band gap and no dependence thereof on a direction in the photonic crystal of the present invention, the same results are obtainable experimentally.

In the photonic crystal fabricated in the embodiment, a band gap for light on the millimeter-wave level has been disclosed. Actually employed, however, are photonic crystals exhibiting a photonic band gap for light at wavelengths within the infrared to visible range. Photonic crystals corresponding to light in the infrared to visible range can by fabricated by machining holes in the above-described semiconductor and forming multiple rods comprised of air in the semiconductor at multiple positions having two-dimensional rotational symmetry. A photonic crystal thus fabricated can be presumed to exhibit the same good characteristics as demonstrated by the present embodiment.

The present invention provides a novel photonic crystal in which is formed a full photonic band gap capable of blocking light in all directions of propagation. The present invention further provides a novel photonic crystal without directional dependence of the photonic band gap. Still further, the present invention provides a novel photonic crystal permitting a reduction in restrictions on the selection and fabrication of constituent materials. Still further, the present invention provides an optical waveguide element affording little loss of light and reducing the limits on the direction of bending of the propagation path of the light. Still further, the present invention provides an optical waveguide element broadening the scope of freedom in the design of optical circuits when applied to optical circuits.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical waveguide element comprising a photonic crystal having a structure of which the refractive index changes with a periodicity defined in a polar coordinate system, optical inlet and outlet regions on the surface of said photonic crystal, and a defect region of incomplete photonic crystal periodicity formed within said photonic crystal, wherein said defect region functions as an optical waveguide path by guiding from said inlet region to said outlet region an optical signal incapable of propagating through the photonic band gap of said photonic crystal.

2. The optical waveguide element of claim 1, wherein said photonic crystal has the structure in which refractive index changes between two values of $n_1$ and $n_2$ (where $n_1$ is not equal to $n_2$) based on a periodicity defined in a polar coordinate system.

3. The optical waveguide element of claim 1, wherein said photonic crystal periodicity is of a non-translational symmetry.

4. The optical waveguide element of claim 1, wherein said photonic crystal periodicity has a rotational symmetry.

5. The optical waveguide element of claim 1, wherein said photonic crystal periodicity is two-dimensionally defined in a polar coordinate system.

6. The optical waveguide element of claim 1, wherein said photonic crystal is in which a structural unit comprising a first material with a refractive index of $n_1$ and a second material with a refractive index of $n_2$ (where $n_1$ is not equal to $n_2$) repeatedly occurs at positions rotated by a θ degree (0<θ☐360) about a point serving as the center of a polar coordinate system.

7. The optical waveguide element of claim 1, wherein said photonic crystal is in which a region having a refractive index differing from air in space is arranged with a periodicity defined by a polar coordinate system.

8. The optical waveguide element of claim 1, wherein said defect region comprises at least one bend in the direction of light propagation.

9. The optical waveguide element of claim 1, wherein said defect region comprises at least one region lying in a circular arc in the direction of light propagation.

10. An optical waveguide element comprising:

photonic crystal comprising plural elements with a refractive index $n_1$ arranged in a two-dimensional rotational symmetry lattice and plural spaces with a refractive index $n_2$ (where $n_1$ is not equal to $n_2$) between adjacent said elements;

optical inlet and outlet regions on the surface of said photonic crystal; and a defect region of incomplete said two-dimensional rotational symmetry lattice formed within said photonic crystal, wherein said defect region functions as an optical waveguide path by guiding from said inlet region to said outlet region an optical signal incapable of propagating through the photonic band gap of said photonic crystal.

11. The optical waveguide element of 10, wherein said defect region comprises radially extending portion.

12. The optical waveguide element of 10, wherein said defect region comprises circularly extending portion.

* * * * *